(12) United States Patent
Kazalbash et al.

(10) Patent No.: US 12,446,974 B2
(45) Date of Patent: Oct. 21, 2025

(54) INTRAVASCULAR DEVICE POSITIONING SYSTEM

(71) Applicant: Cephea Valve Technologies, Inc., Abbott Park, IL (US)

(72) Inventors: Murrad Kazalbash, Santa Clara, CA (US); Austin Sherman, Sunnyvale, CA (US)

(73) Assignee: Cephea Valve Technologies, Inc., Abbott Park, IL (US)

(*) Notice: Subject to any disclaimer, the term of this patent is extended or adjusted under 35 U.S.C. 154(b) by 69 days.

(21) Appl. No.: 18/491,178

(22) Filed: Oct. 20, 2023

(65) Prior Publication Data

US 2024/0138929 A1    May 2, 2024

Related U.S. Application Data

(60) Provisional application No. 63/381,416, filed on Oct. 28, 2022.

(51) Int. Cl.
*A61B 34/20* (2016.01)
*A61B 90/00* (2016.01)

(52) U.S. Cl.
CPC .............. *A61B 34/20* (2016.02); *A61B 90/37* (2016.02); *A61B 2034/2046* (2016.02)

(58) Field of Classification Search
CPC . A61B 34/20; A61B 90/37; A61B 2034/2046; A61B 8/565; A61B 6/12; A61B 8/0883; A61B 8/0891; A61B 8/12; A61B 8/4245; A61B 8/445; A61B 8/466; A61B 8/483; A61B 8/5223; A61B 8/0841; A61B 2090/376; A61B 2090/378; A61B 2090/3925; A61B 2090/3966

See application file for complete search history.

(56) References Cited

U.S. PATENT DOCUMENTS

| | | | |
|---|---|---|---|
| 9,867,556 B2 | 1/2018 | Balachandran | |
| 10,582,882 B2 | 3/2020 | Balachandran | |
| 11,324,495 B2 | 5/2022 | Von Oepen | |
| 2005/0038507 A1 | 2/2005 | Alferness | |
| 2006/0276710 A1* | 12/2006 | Krishnan | A61B 5/283 |
| | | | 600/424 |
| 2007/0027392 A1* | 2/2007 | Schwartz | A61B 8/12 |
| | | | 600/443 |
| 2019/0183639 A1* | 6/2019 | Moore | A61F 2/2409 |
| 2019/0255285 A1* | 8/2019 | Freeseman | A61M 25/0074 |

(Continued)

FOREIGN PATENT DOCUMENTS

EP          0442774 A1 *  8/1991

*Primary Examiner* — Alexei Bykhovski
(74) *Attorney, Agent, or Firm* — SLEMAN & LUND LLP

(57) ABSTRACT

Systems and methods are provided for positioning an intravascular device. A sensing device includes a plurality of nodes disposed on a distal portion of the sensing device. The distal portion of the sensing device is inserted into a circumflex artery. A plurality of node locations of the plurality of nodes are determined in a coordinate system when the distal portion of the sensing device is inserted into the circumflex artery. A projected plane of a mitral annulus is determined in the coordinate system based on the plurality of node locations. A projected deployment point for the intravascular device is determined in the coordinate system based on the plurality of node locations.

20 Claims, 9 Drawing Sheets

(56) References Cited

U.S. PATENT DOCUMENTS

2020/0323634 A1\* 10/2020 Von Oepen ........... A61F 2/2427
2021/0322166 A1   10/2021 Von Oepen
2023/0036150 A1\*  2/2023 Wiles ..................... A61B 34/20

\* cited by examiner

INTRAVASCULAR DEVICE POSITIONING SYSTEM

CROSS-REFERENCE TO RELATED APPLICATIONS

The present application claims priority to U.S. Provisional Ser. No. 63/381,416, filed Oct. 28, 2022, the disclosure of which is hereby incorporated by reference in its entirety as if fully set forth herein.

FIELD OF THE DISCLOSURE

The present disclosure relates generally to positioning a cardiovascular device. More particularly, embodiments described herein relate to devices, systems, and methods configured to facilitate cardiovascular imaging during medical procedures.

BACKGROUND

Intravascular medical procedures allow the performance of therapeutic treatments in a variety of locations within a patient's body while requiring only relatively small access incisions. An intravascular procedure may, for example, eliminate the need for open-heart surgery, reducing risks, costs, and time associated with an open-heart procedure. The intravascular procedure also enables faster recovery times, lower associated costs, and a lower risk of complications. An example of an intravascular procedure that significantly reduces procedure and recovery time and cost over conventional open surgery is a heart valve replacement or repair procedure in which an artificial valve or valve repair device is guided to the heart through the patient's vasculature. Precise control of the distal end of the catheter allows for more reliable and faster positioning of a medical device and/or implant and other improvements in the procedures.

An intravascularly-delivered device should be placed precisely to achieve optimum functionality of the medical device. Such procedures are often performed with the aid of imaging techniques. Image-guided systems may use x-ray, ultrasound, or other imaging techniques to relay the patient's anatomy and/or movements of a medical device, such as a catheter, in relation to the patient. Imaging techniques can have certain limitations. For example, it may be difficult to determine an accurate position and orientation of a cardiovascular device and/or the corresponding delivery device. For replacement valves, such positional information can be important for the valve to be installed in a correct position and orientation to ensure proper functioning of the replacement valve and to prevent injury to the patient. Furthermore, a cardiovascular device may be difficult to reposition after the cardiovascular device is fully deployed from the delivery system. Systems, devices, and methods described herein can be used to address these and other issues.

SUMMARY

One aspect of the disclosure provides a method for positioning an intravascular device, the method comprising: inserting, into a circumflex artery, a distal portion of a sensing device, the distal portion comprising a plurality of nodes; determining a plurality of node locations of the plurality of nodes in a coordinate system when the distal portion of the sensing device is inserted into a circumflex artery; determining a projected plane of a mitral annulus in the coordinate system based on the plurality of node locations; and determining a projected deployment point for the intravascular device in the coordinate system based on the plurality of node locations.

In one example, the intravascular device is a mitral valve replacement device.

In one example, inserting the distal portion of the sensing device comprises inserting the distal portion of the sensing device until a distal reference point of the sensing device is aligned with a septal wall.

In one example, determining the projected plane of the mitral annulus comprises performing an interpolation procedure on the plurality of node locations.

In one example, determining the projected deployment point comprises determining a projected center point of the mitral annulus.

In one example, determining the projected deployment point comprises determining an offset from the projected center point.

In one example, determining the projected center point of the mitral annulus comprises performing one or more triangulation calculations based on the plurality of node locations.

In one example, nodes of the plurality of nodes are evenly spaced on the distal portion of the sensing device.

In one example, the plurality of nodes includes a plurality of radiopaque markers; and determining the plurality of node locations comprises processing one or more fluoroscopy images during a procedure for deploying the intravascular device.

In one example, the plurality of nodes includes a plurality of echogenic markers; and determining the plurality of node locations comprises processing one or more ultrasound images during a procedure for deploying the intravascular device.

In one example, the plurality of nodes includes a plurality of sensors; and determining the plurality of node locations is based on sensor data transmitted by the plurality of sensors.

Another aspect of the disclosure provides a medical navigation system for positioning an intravascular device, the medical navigation system comprising: a sensing device comprising a plurality of nodes disposed on a distal portion of the sensing device; one or more processors; and at least one memory storing instructions that, when executed by the one or more processors, cause the one or more processors to: determine a plurality of node locations in a coordinate system when the distal portion of the sensing device is inserted into a circumflex artery; determine a projected plane of a mitral annulus in the coordinate system based on the plurality of node locations; and determine a projected deployment point for the intravascular device in the coordinate system based on the plurality of node locations.

In one example, the system further includes at least one imaging interface configured to acquire imaging data from at least one medical imaging device; and a display interface configured to transmit display data to a display device; wherein the instructions, when executed by the one or more processors, cause the one or more processors to: transmit signals over the display interface that cause the display device to render one or more enhanced images based on the imaging data, the one or more enhanced images including an overlay representation of the projected deployment point.

In one example, the plurality of nodes includes a plurality of radiopaque plurality of node locations; wherein the at least one imaging interface comprises a fluoroscopic device interface configured to acquire fluoroscopic data describing one or more fluoroscopic images comprising the mitral annulus and the distal portion of the sensing device; and wherein determining the plurality of node locations comprises analyzing the fluoroscopic data.

In one example, the plurality of nodes includes a plurality of echogenic markers; wherein the at least one imaging interface comprises an ultrasound device interface configured to acquire ultrasound data describing one or more ultrasound images comprising the mitral annulus and the distal portion of sensing device; and wherein determining the plurality of node locations comprises analyzing the ultrasound data.

In one example, the system further includes a sensing device interface configured to acquire sensor data from the sensing device; wherein the plurality of nodes includes a plurality of sensors configured to transmit sensor data to the sensing device interface; and wherein determining the plurality of node locations comprises analyzing the sensor data transmitted from the plurality of sensors.

In one example, the intravascular device is a mitral valve replacement device.

In one example, determining the projected plane of the mitral annulus comprises performing an interpolation procedure on the plurality of node locations.

In one example, determining the projected deployment point comprises: determining a projected center point of the mitral annulus; and determining an offset from the projected center point.

In one example, determining the projected center point of the mitral annulus comprises performing one or more triangulation calculations based on the plurality of node locations.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not to be considered to be limiting of its scope, the invention will be described and explained with additional specificity and detail through the use of the accompanying drawings in which.

DETAILED DESCRIPTION

Figure 1:
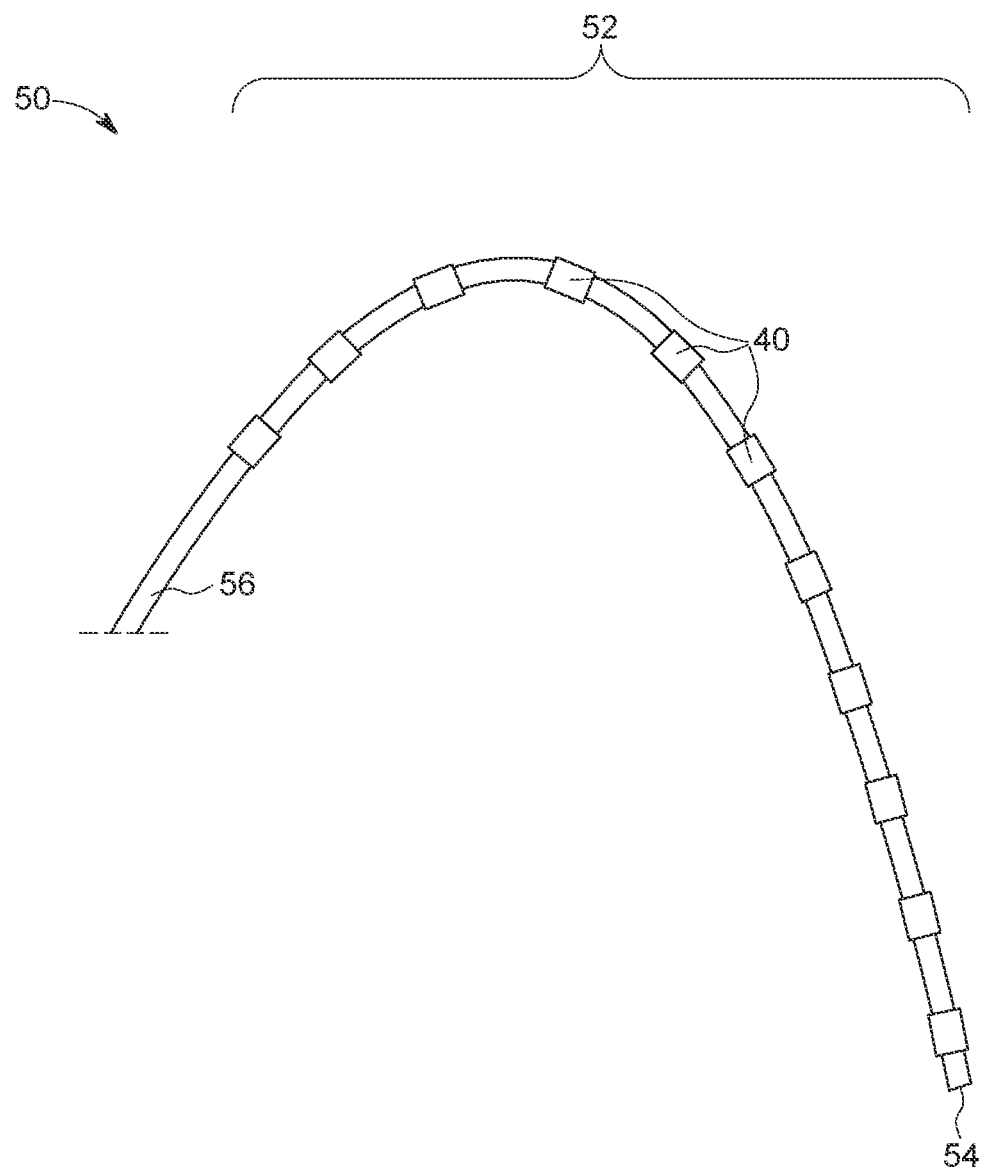
FIG. 1 illustrates a perspective view of a distal portion of an example sensing device.

In the following description, numerous specific details are set forth in order to provide a thorough understanding of the disclosure. It will be apparent, however, that the embodiments may be practiced without these specific details. The detailed description that follows describes exemplary embodiments and the features disclosed are not intended to be limited to the expressly disclosed combination(s). Therefore, unless otherwise noted, features disclosed herein may be combined to form additional combinations that were not otherwise shown for purposes of brevity.

The present disclosure is directed to devices, systems, and methods for delivering, positioning, and/or deploying a cardiovascular device. Throughout this disclosure, many examples are described in the context of a replacement artificial mitral valve. One of skill in the art will understand, however, that the described components, features, and principles may also be utilized in other applications. For example, at least some of the embodiments described herein may be utilized for delivering, positioning, and/or deploying an artificial valve for replacing a pulmonary, aortic, or tricuspid valve.

Moreover, it will be understood that at least some of the delivery system embodiments described herein may be utilized in conjunction with other intravascular devices, including valve repair devices, annuloplasty devices, clip devices, and other intravascular devices not necessarily configured as a replacement valve. Thus, although one or more examples refer specifically to a replacement mitral valve device, it will be understood that the same description may be applied to embodiments that utilize other suitable intravascular devices in other interventional procedures.

Notwithstanding such alternative applications, preferred embodiments described herein are configured to address challenges particularly associated with loading, delivering, positioning, and deploying an artificial replacement heart valve device. For example, where relatively simple catheters may be suitable for delivery of a clip or other such repair device, the larger size and/or more complex geometry of a replacement valve, particularly a replacement mitral or tricuspid valve, requires more robust delivery system features to properly load, deliver, and deploy the device. The embodiments described below are therefore particularly useful for meeting the additional procedural challenges associated with heart valve replacement through an intravascular approach.

General Overview

The present disclosure generally describes devices, systems, methods, and other techniques for positioning an intravascular device.

One aspect of the disclosure is directed to a method for positioning an intravascular device. The method comprises inserting, into a circumflex artery, a distal portion of a sensing device, the distal portion comprising a plurality of nodes; determining a plurality of node locations of the plurality of nodes in a coordinate system when the distal portion of the sensing device is inserted into a circumflex artery; determining a projected plane of a mitral annulus in the coordinate system based on the plurality of node locations; and determining a projected deployment point for the intravascular device in the coordinate system based on the plurality of node locations.

In examples, the intravascular device is a mitral valve replacement device.

In examples, inserting the distal portion of the sensing device comprises inserting the distal portion of sensing device until a distal reference point of the sensing device is aligned with a septal wall.

In examples, determining the projected plane of the mitral annulus comprises performing an interpolation procedure on the plurality of node locations.

In examples, determining the projected deployment point comprises determining a projected center point of the mitral annulus. As an alternative or addition, determining the projected deployment point comprises determining an offset from the projected center point. As an alternative or addition, determining the projected center point of the mitral annulus comprises performing one or more triangulation calculations based on the plurality of node locations.

In examples, nodes of the plurality of nodes are evenly spaced on the distal portion of the sensing device.

In examples, the plurality of nodes includes a plurality of radiopaque markers; and determining the plurality of node locations comprises processing one or more fluoroscopy images during a procedure for deploying the intravascular device.

In examples, the plurality of nodes includes a plurality of echogenic markers; and determining the plurality of node locations comprises processing one or more ultrasound images during a procedure for deploying the intravascular device.

In examples, the plurality of nodes includes a plurality of sensors; and determining the plurality of node locations is based on sensor data transmitted by the plurality of sensors.

One aspect of the disclosure is directed to a medical navigation system for positioning an intravascular device. The medical navigation system includes a sensing device comprising a plurality of nodes disposed on a distal portion of the sensing device; one or more processors; and at least one memory storing instructions that, when executed by the one or more processors, cause the one or more processors to: determine a plurality of node locations in a coordinate system when the distal portion of the sensing device is inserted into a circumflex artery; determine a projected plane of a mitral annulus in the coordinate system based on the plurality of node locations; and determine a projected deployment point for the intravascular device in the coordinate system based on the plurality of node locations.

In examples, the medical navigation system includes at least one imaging interface configured to acquire imaging data from at least one medical imaging device; and a display interface configured to transmit display data to a display device; wherein the instructions, when executed by the one or more processors, cause the one or more processors to transmit signals over the display interface that cause the display device to render one or more enhanced images based on the imaging data, the one or more enhanced images including an overlay representation of the projected deployment point.

In examples, the plurality of nodes includes a plurality of radiopaque plurality of node locations; the at least one imaging interface comprises a fluoroscopic device interface configured to acquire fluoroscopic data describing one or more fluoroscopic images comprising the mitral annulus and the distal portion of the sensing device; and determining the plurality of node locations comprises analyzing the fluoroscopic data.

In examples, the plurality of nodes includes a plurality of echogenic markers; the at least one imaging interface comprises an ultrasound device interface configured to acquire ultrasound data describing one or more ultrasound images comprising the mitral annulus and the distal portion of sensing device; and determining the plurality of node locations comprises analyzing the ultrasound data.

In examples, the medical navigation system includes a sensing device interface configured to acquire sensor data from the sensing device; the plurality of nodes includes a plurality of sensors configured to transmit sensor data to the sensing device interface; and determining the plurality of node locations comprises analyzing the sensor data transmitted from the plurality of sensors.

In examples, the intravascular device is a mitral valve replacement device.

In examples, determining the projected plane of the mitral annulus comprises performing an interpolation procedure on the plurality of node locations.

In examples, determining the projected deployment point comprises: determining a projected center point of the mitral annulus; and determining an offset from the projected center point.

In examples, determining the projected center point of the mitral annulus comprises performing one or more triangulation calculations based on the plurality of node locations.

In examples, nodes of the plurality of nodes are evenly spaced on the distal portion of the sensing device.

In some implementations, the various techniques described herein may achieve one or more of the following advantages: an intravascular device may be positioned and deployed in the correct position and orientation; a mitral valve replacement device may be delivered to a target location in a centered and coaxial position relative to the mitral valve; a patient's anatomical features may be accurately located and/or modeled during a procedure; projected features are determined and used to generate enhanced images to facilitate navigation, positioning, and deployment of an intravascular device; contact with sensitive portions of the anatomy may be minimized during the procedure; and reliance on echogenic techniques and apparatus during the procedure may be eliminated and/or minimized. Additional features and advantages are apparent from the specification and the drawings.

System Overview

FIG. 1 illustrates a perspective view of a distal portion of an example sensing device. The sensing device 50 is used to collect sensing device data to aid medical navigation. The sensing device 50 is an intravascular device comprising a distal tip 54 that may be inserted into a patient's vasculature. The distal tip 54 is advanced to position the distal portion 52 of the sensing device 50 within a specified portion of the patient's anatomy to collect sensing device data. In examples, the sensing device 50 generates the sensing device data. As an addition or alternative, the sensing device data is generated based on imaging data captured by a medical imaging device when the sensing device 50 is in view of the medical imaging device.

The sensing device data is usable to generate medical navigation information relating to an anatomical feature of the patient. In examples, the distal portion 52 of the sensing device 50 may be positioned within the circumflex artery of the patient to collect sensing device data usable to generate medical navigation information relating to the patient's mitral annulus. As an alternative or addition, the distal portion 52 of the sensing device 50 may be positioned in another vessel of the patient to collect sensing device data usable to generate medical navigation information relating to another anatomical feature of the patient. In examples, the sensing device 50 is used to position a mitral valve replacement device.

The distal portion 52 of the sensing device 50 includes a plurality of nodes 40. The sensing device data includes location data describing a location of one or more nodes 40 when the distal portion 52 of the sensing device 50 is inserted into a vessel of the patient. In examples, one or more node locations are determined in a coordinate system that is oriented to an anatomical feature of the patient. For example, one or more node locations may be determined in a coordinate system that is registered to the patient's anatomy. In examples, the coordinate system is a common coordinate system that is also registered with one or more medical imaging devices and/or medical systems.

In examples, the sensing device 50 comprises a flexible rod 56, and the distal portion 52 of the sensing device 50 comprises a distal portion of the flexible rod 56. The flexible rod 56 is suitably flexible to allow atraumatic navigation of the flexible rod 56 through the patient's vasculature, such as to position the distal portion 52 of the sensing device 50 in the desired location. In examples, the flexible rod 56 comprises an elongated flexible member suitable for intravascular insertion. For example, the flexible rod 56 may comprise a core wire member wrapped with a smaller wire coil or braided wires, which may be formed from stainless steel, nitinol or another material. As an alternative or addition, the flexible rod 56 may include a polymer coating, such as but not limited to silicone or polytetrafluoroethylene (PTFE). For example, the flexible rod 56 may be a guidewire. As an alternative or addition, the flexible rod 56 may be a hollow rod or tube. The nodes 40 may be coupled with the flexible rod 56 using any technique, such as but not limited to adhesive, fasteners, welding, press fit techniques, and/or other techniques.

The nodes 40 are disposed on the distal portion 52 of the sensing device 50 at known positions relative to the sensing device 50. In examples, the relative positions of the nodes 40 are defined over a length of the flexible rod 56, such as by a distance or spacing between adjacent nodes 40, a distance from a particular node 40, a distance from the distal tip 54, a distance from another reference point on the flexible rod 56, a distance from another reference point on the sensing device 50, or any other measurement. In examples, the nodes 40 are evenly spaced on the distal portion 52 of the sensing device 50.

The node location of the plurality of nodes 40 may be determined based on sensing device data collected when the sensing device 50 is inserted into the vessel of the patient. For example, one or more of the nodes 40 comprise a radiopaque marker visible on an X-ray image, and the corresponding node location/s may be determined by processing sensing device data comprising one or more fluoroscopic images captured by a medical imaging device. As an alternative or addition, one or more of the nodes 40 may comprise an echogenic marker visible on an ultrasound image, and the corresponding node location/s may be determined by processing sensing device data comprising one or more ultrasound images captured by a medical imaging device. As an alternative or addition, one or more nodes 40 may comprise one or more sensors that collect sensor data when the distal portion 52 of the sensing device 50 is inserted in the vessel of the patient, and the corresponding node location/s may be determined based on sensing device data comprising sensor data transmitted by the corresponding sensor/s. In examples, determining the node locations in the coordinate system that is registered to the patient's anatomy is based on the relative positions of the nodes 40 on the sensing device 50.

Interpolation techniques may be used to determine one or more projected features, such as by performing an interpolation procedure on one or more node locations of the plurality of nodes 40. For example, an interpolation procedure may be performed to determine a projected geometry of the mitral annulus 38, a projected plane of the mitral annulus 38, a projected center point of the mitral annulus 38, a projected deployment point for an intravascular device, and the like. As an alternative or addition, an interpolation procedure may be performed to determine one or more projected features of the mitral valve 36 and/or the mitral valve leaflets A1-A3, P1-P3. The interpolation techniques may include triangulation, spline completion, other spline calculations, and/or other interpolation techniques. As used herein, the term "spline" refers to a piecewise parametric curve and/or a class of techniques for data interpolation and/or smoothing. Performing an interpolation procedure on one or more node locations may include applying one or more interpolation functions on one or more node locations. As an addition or alternative, performing an interpolation procedure on one or more node locations may include applying one or more interpolation functions on an intermediate calculation derived from one or more node locations.

Figure 2:
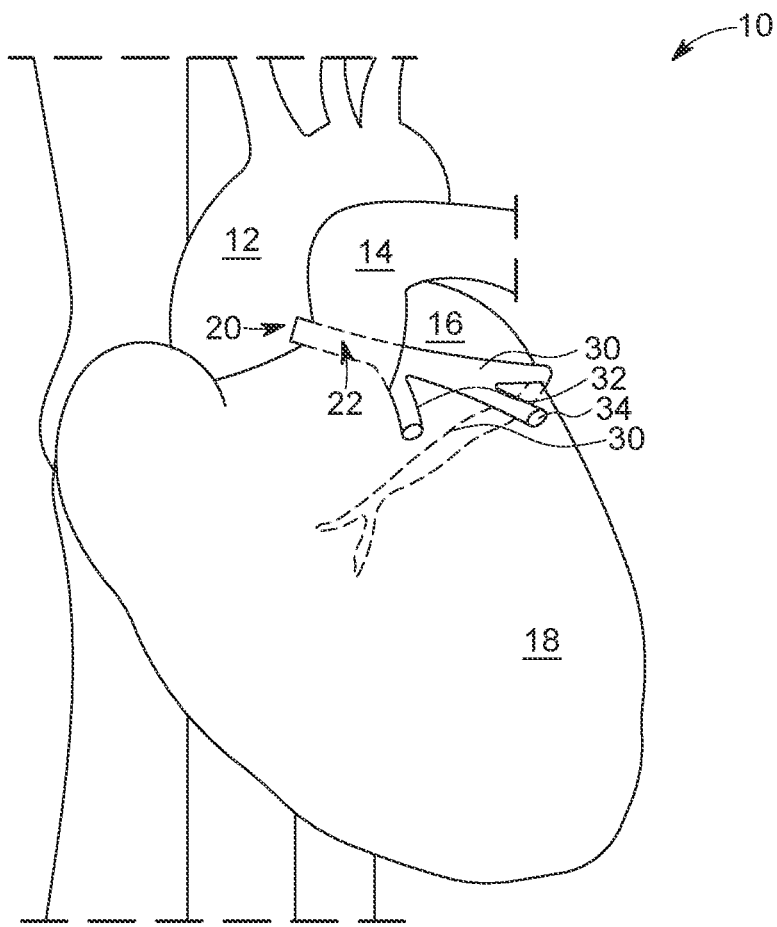
FIG. 2 illustrates a perspective view of a cardiovascular system including the circumflex artery.

FIG. 2 illustrates a perspective view of a cardiovascular system including the circumflex artery. The cardiovascular system 10 includes a heart 18. The left coronary artery 22 branches from the aorta 12 at the ostium 20 of the left coronary artery 22, passing between the pulmonary trunk 14 and the left atrial appendage 16 of the heart. The circumflex artery 30 branches off the left coronary artery 22. The circumflex artery 30 supplies oxygenated blood to the left atrium, the posterior and lateral free walls of the left ventricle, and part of the anterior papillary muscle. The circumflex artery 30 may include a variable number of left marginal branches, and the terminal branch is usually the largest of these branches. The left anterior descending artery 32 and the left marginal artery 34 are other branches of the left coronary artery 22, which are partially shown.

Figure 3:
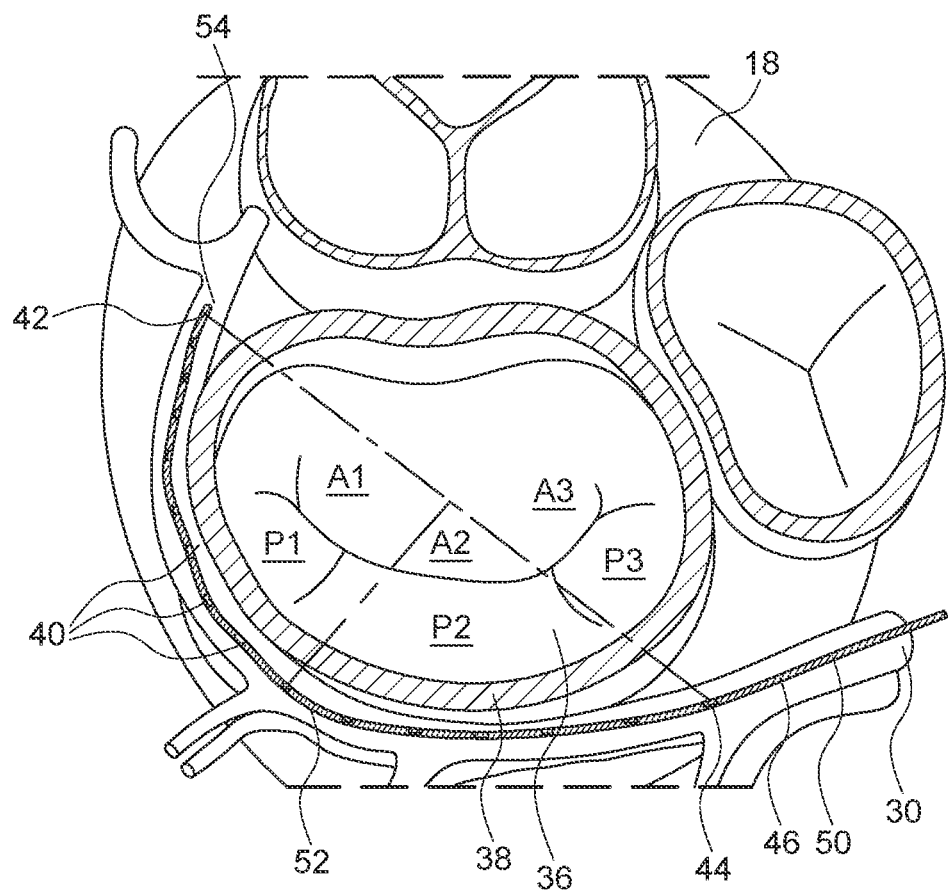
FIG. 3 illustrates a superior cutaway view of a heart showing an example approach for inserting a distal portion of a sensing device into the circumflex artery.

FIG. 3 is a superior cutaway view of a heart showing an example approach for inserting a distal portion of a sensing device into the circumflex artery. Typically, the circumflex artery 30 runs in proximity to a portion of the mitral annulus 38 of the mitral valve 36. The mitral annulus 38 is a fibrous ring of tissue that circumscribes the perimeter of the orifice of the mitral valve 36. The leaflets A1-A3, P1-P3 of the mitral valve 36 are typically formed by a continuous band of tissue that extends from the mitral annulus 38. The typical geometry of the mitral annulus 38 is approximately a hyperbolic paraboloid. The geometry of the mitral annulus 38 changes during the cardiac cycle in synchrony with valve closure and leaflet coaptation. In systole, the mitral annulus 38 typically has a non-planar saddle shape. In diastole, the mitral annulus 38 has a more circular shape. One or more techniques described herein are compatible with cardioplegia, beating heart, and/or rapid pacing procedures. The mitral annulus 38 and the circumflex artery 30 are concentric and typically remain concentric without offset changes during the cardiac cycle.

The plurality of nodes 40 of the sensing device 50 includes a distal edge node 42 and a proximal edge node 44. A plurality of the nodes 40 of the sensing device 50 are within a relevant range of the mitral annulus 38 or other anatomical feature of the patient. For example, in FIG. 3, the distal edge node 42 is the node 40, of the nodes 40 that are within the relevant range of the mitral annulus 38, that is closest to the distal tip 54 of the sensing device 50. The proximal edge node 44 is the node 40, of the nodes 40 that are within the relevant range of the mitral annulus 38, that is closest to the proximal end of the sensing device 50. The sensing device 50 may include one or more additional nodes that are not within the relevant range of the mitral annulus 38. For example, an additional proximal node 46 may be proximal to the proximal edge node 44 that is within the relevant range of the mitral valve. As an alternative or addition, an additional distal node (not shown) may be distal to the distal edge node 42 that is within the relevant range of the mitral valve 36. That is, the sensing device 50 may include additional nodes that are not within the relevant range of the mitral valve, which may be excluded from one or more calculations described herein. In some examples, radius-of-curvature calculations are used to determine the proximal edge node 44 that is within the relevant range of the mitral valve 36 and/or to identify one or more proximal edge nodes that are not within the relevant range of the mitral valve. As an alternative or addition, radius-of-curvature calculations may be used to determine the distal edge node 42 that is within the relevant range of the mitral valve 36 and/or to identify one or more distal edge nodes that are not within the relevant range of the mitral valve.

The plurality of nodes 40 that are within the relevant range of the mitral annulus 38 may be determined based on the position of the sensing device 50 in the patient, properties of the patient indicative of the size of the circumflex artery 30, properties of the patient indicative of the size of the heart, imaging techniques, and/or other factors. In examples, interpolation techniques are be used to determine one or more projected features based on one or more node locations of the plurality of nodes 40 that are within the relevant range.

The distal portion 52 of the sensing device 50 is inserted into the circumflex artery 30 to position the distal portion 52 of the sensing device 50 such that the plurality of nodes 40 is deployed in a desired location within the circumflex artery 30, such as to generate medical navigation information relating to the mitral annulus 38. In examples, the distal portion 52 of the sensing device 50 is inserted into the circumflex artery 30 until a distal reference point of the sensing device 50 is aligned with a septal wall of the heart 18 (e.g., the septal wall separating the aortic valve and the mitral valve). For example, the distal reference point may be the distal edge node 42. As an alternative or addition, the distal reference point may be another distal feature of the sensing device 50, such as the distal tip 54 of the sensing device or another distal reference point. In examples, the distal reference point may include one or more radiopaque and/or echogenic markers to aid with positioning the distal portion 52 of the sensing device 50 and/or the plurality of nodes 40 in the desired location within the circumflex artery 30. For example, images generated by a medical imaging device, such as a fluoroscopy device and/or an ultrasound device, may be used to detect the distal reference point, such as to position the distal portion 52 of the sensing device 50 based on the appearance of the distal reference point in the images.

Figure 4A:
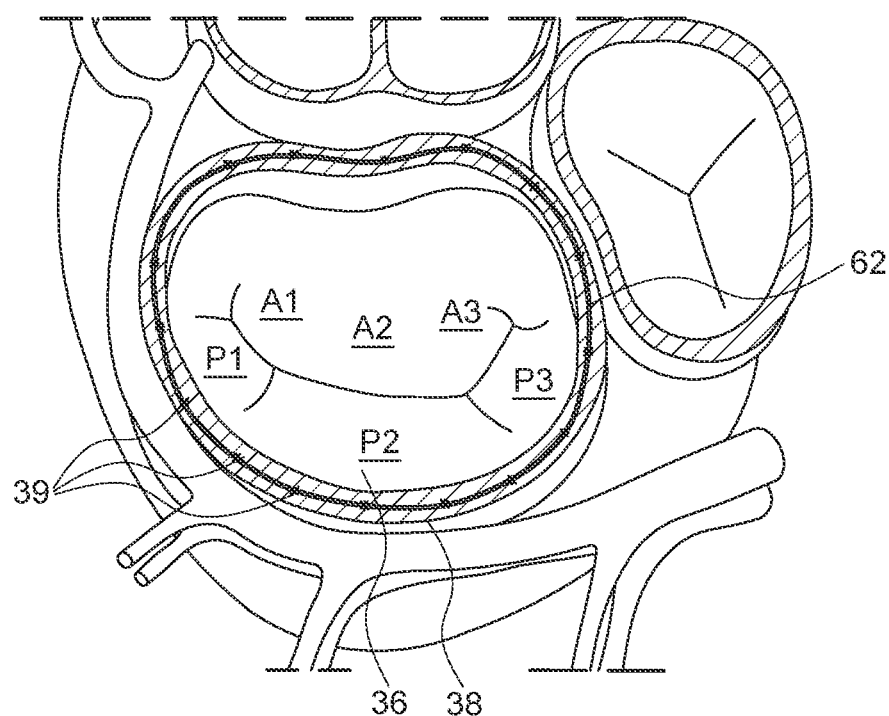
FIG. 4A illustrates an example interpolation procedure for determining a geometry of a mitral annulus based on a set of sample locations on the mitral annulus.

FIG. 4A illustrates an example interpolation procedure for determining a geometry of a mitral annulus based on a set of sample locations on the mitral annulus. The set of sample locations 39 comprise locations within a mitral annulus 38. For example, the set of sample locations 39 may correspond to points that are located within the mitral annulus 38 in a coordinate system registered to the patient's anatomy. A geometry 62 approximating the geometry of the mitral annulus 38 may be calculated in the coordinate system based on the set of sample locations 39. For example, the geometry 62 may be calculated using one or more interpolation techniques, such as but not limited to spline completion and/or other spline calculations. While the sample locations 39 within the mitral annulus 38 can result in an accurate geometry 62 approximating the mitral annulus 38, it is not practical to identify the set of sample locations 39 during an intravascular procedure, even with the guidance of three-dimensional imaging techniques for imaging soft tissue.

Figure 4B:
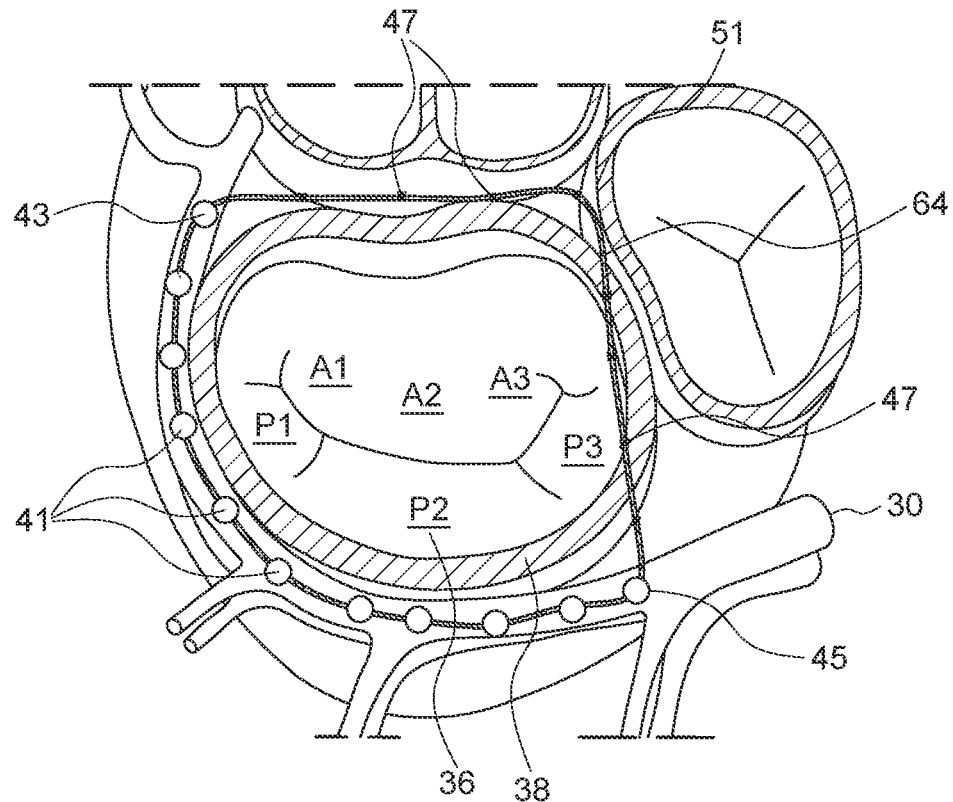
FIG. 4B illustrates an example interpolation procedure for determining a projected geometry of a mitral annulus based on a set of node locations.

FIG. 4B illustrates an example interpolation procedure for determining a projected geometry of a mitral annulus based on a set of node locations. The set of node locations 41 comprise locations of a plurality of nodes 40, such as a plurality of the nodes 40 of the sensing device 50 that are within the relevant range of the mitral annulus 38 when the distal portion 52 of the sensing device 50 is inserted into the circumflex artery 30. The set of node locations 41 includes a distal node location 43 of a distal edge node 42 and a proximal node location 45 of a proximal edge node 44. The set of node locations 41 may be determined based on sensing device data that is collected when the sensing device 50 is inserted into the circumflex artery 30. In examples, the set of node locations 41 correspond to points in a coordinate system registered to the patient's anatomy.

In examples, a projected geometry 64 of the mitral annulus 38 is determined based on the set of node locations 41. The projected geometry 64 is a representation of the geometry of the mitral annulus 38 that is calculated based on the set of node locations 41. For example, the projected geometry 64 may be calculated using one or more interpolation techniques, such as but not limited to spline completion and/or other spline calculations. In examples, determining the projected geometry 64 includes determining a set of projected locations 47 that are calculated based on interpolation techniques. For example, interpolation techniques may be used to determine a first subset of projected locations 47 between the distal node location 43 and a transition point 51, and a second subset of projected locations 48 between the proximal node location 45 and the transition point 51. The interpolation techniques may be configured to form about a ninety-degree angle in the projected geometry 64 at or close to the distal node location 43. As an addition or alternative, the interpolation techniques may be configured to form about a ninety-degree angle in the projected geometry 64 at or close to the proximal node location 45. As an addition or alternative, the interpolation techniques may be configured to form about a ninety-degree angle in the projected geometry 64 at or close to the transition point 51. In examples, the interpolation techniques may be used to determine the transition point 51 based on the set of node locations 41. The set of projected locations 47 may include or omit a projected location 47 at the transition point 51. In examples, the projected geometry 64 of the mitral annulus 38 and/or the projected locations 47 is computed as an intermediate calculation to determine another projected feature of the mitral annulus 38.

Figure 4C:
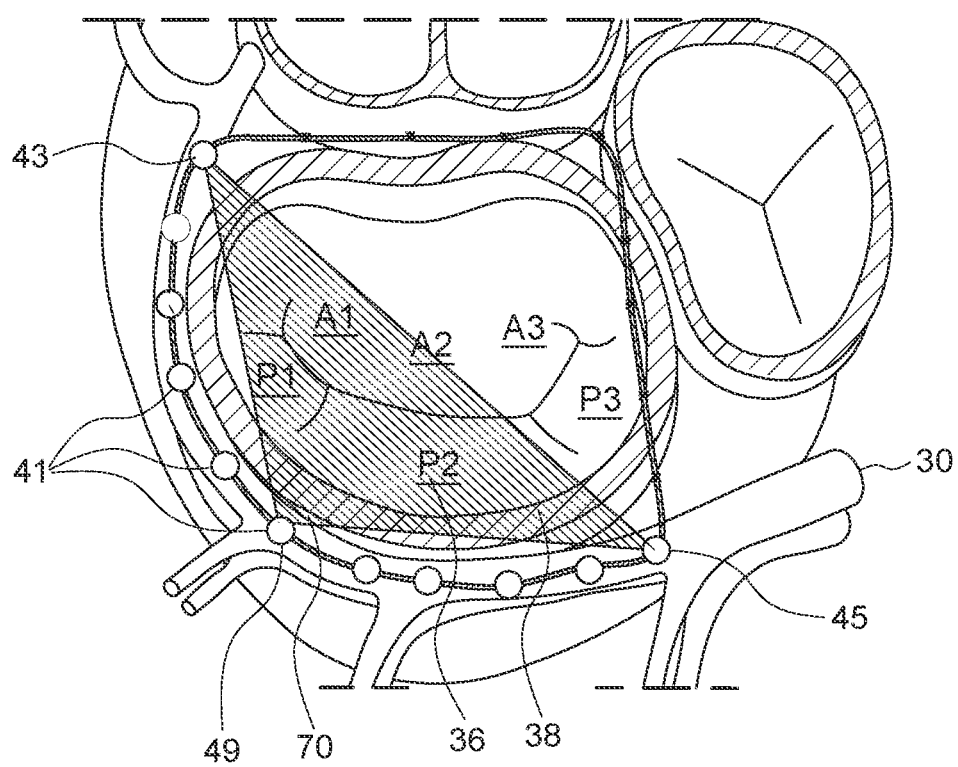
FIG. 4C illustrates an example interpolation procedure for determining a projected plane of a mitral annulus.

FIG. 4C illustrates an example interpolation procedure for determining a projected plane of a mitral annulus. In examples, a projected plane 70 of the mitral annulus 38 is determined based on the set of node locations 41. The projected geometry 64 may be calculated using one or more interpolation techniques, such as but not limited to triangulation, spline completion and/or other spline calculations. For example, a simple triangulation operation is illustrated for determining a projected plane 70 that includes the proximal node location 45, the distal node location 43, and a middle node location 49 corresponding to a node 40 positioned on the distal portion 52 of the sensing device 50 at about a midpoint between the distal edge node 42 and the proximal edge node 44. As an addition or alternative, determining the projected plane 70 may include performing one or multiple triangulation operations involving one or more sets of locations selected from node locations 41 corresponding to the plurality of nodes 40 of the sensing device 50 and/or projected locations 47 that are calculated based on interpolation techniques. In examples, the projected plane 70 of the mitral annulus 38 is computed as an intermediate calculation to determine another projected feature of the mitral annulus 38.

Figure 4D:
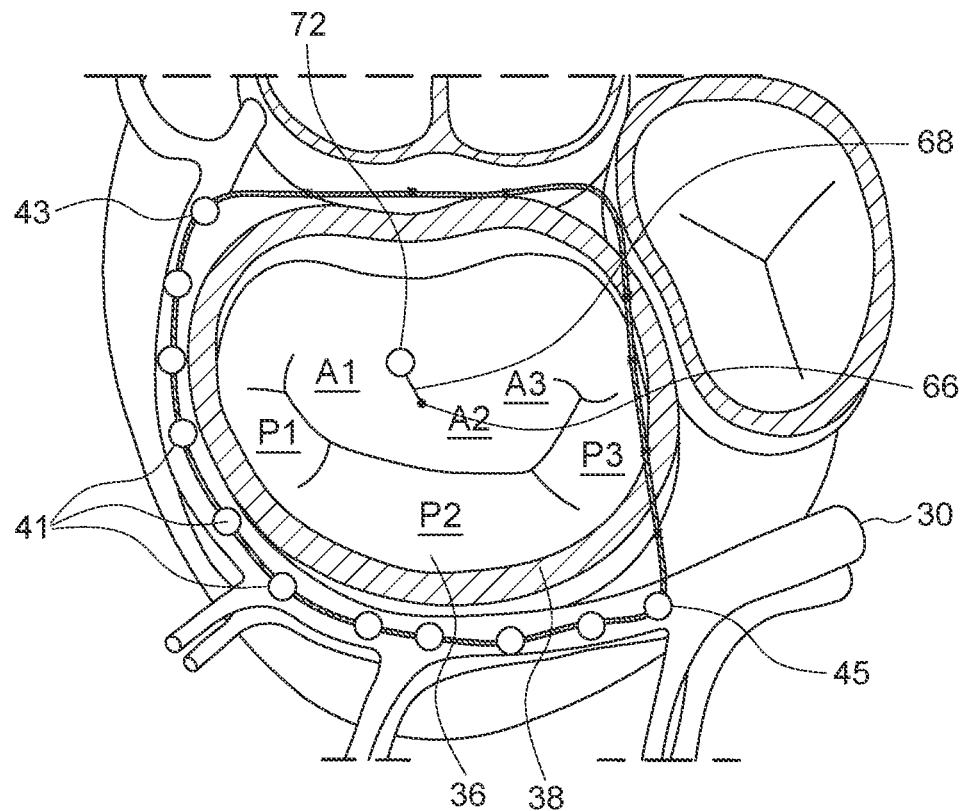
FIG. 4D illustrates an example interpolation procedure for determining projected features related to deployment of a mitral valve replacement device.

FIG. 4D illustrates an example interpolation procedure for determining projected features related to deployment of a mitral valve replacement device. A mitral valve replacement device is typically deployed centrally to the annulus. In examples, a projected center point 66 of the mitral annulus 38 is determined based on the set of node locations 41. The projected center point 66 of the mitral annulus 38 may be calculated using one or more interpolation techniques, such as but not limited to triangulation, spline completion and/or other spline calculations. For example, the projected center point 66 may be determined by performing one or more triangulation operations involving one or more sets of locations selected from the node locations 41 and/or the projected locations 47. In some examples, determining the projected center point 66 includes bisection of a line connecting the distal node location 43 and the proximal node location 45. As an alternative or addition, determining the projected center point 66 may include determining a radius of curvature and/or a center of curvature of a spline. As an alternative or addition, determining the projected center point 66 may include determining a centroid of a shape created from one or more perpendicular projections.

As an alternative or addition, a projected deployment point 72 for an intravascular device is determined based on the set of node locations 41. For example, the projected deployment point 72 may correspond to a location to deploy a mitral valve replacement device. The projected deployment point 72 may be determined based on a projected center point 66 of the mitral annulus 38. For example, the projected center point 66 may be an intermediate calculation derived from the one or more node locations 41. The projected deployment point 72 may be determined based on one or more other factors, such as a type, brand, and/or size of the intravascular device to be deployed, one or more properties of the patient receiving the intravascular device, and/or other factors.

As an alternative or addition, an offset 68 is determined for the intravascular device based on the set of node locations 41. For example, the offset 68 may be a vector from the projected center point 66 of the projected plane 70. The offset 68 may identify the projected deployment point 72 for an intravascular device relative to the projected center point 66. In examples, the offset 68 is perpendicular to the projected plane 70. The offset 68 may be determined based on one or more other factors, such as a type, brand, and/or size of the intravascular device to be deployed, one or more properties of the patient receiving the intravascular device, and/or other factors. In examples, the offset 68 is determined based on a desired depth of deployment relative to a center of the mitral annulus 38 and an orientation that is coaxial to the valvular apparatus.

Figure 5A:
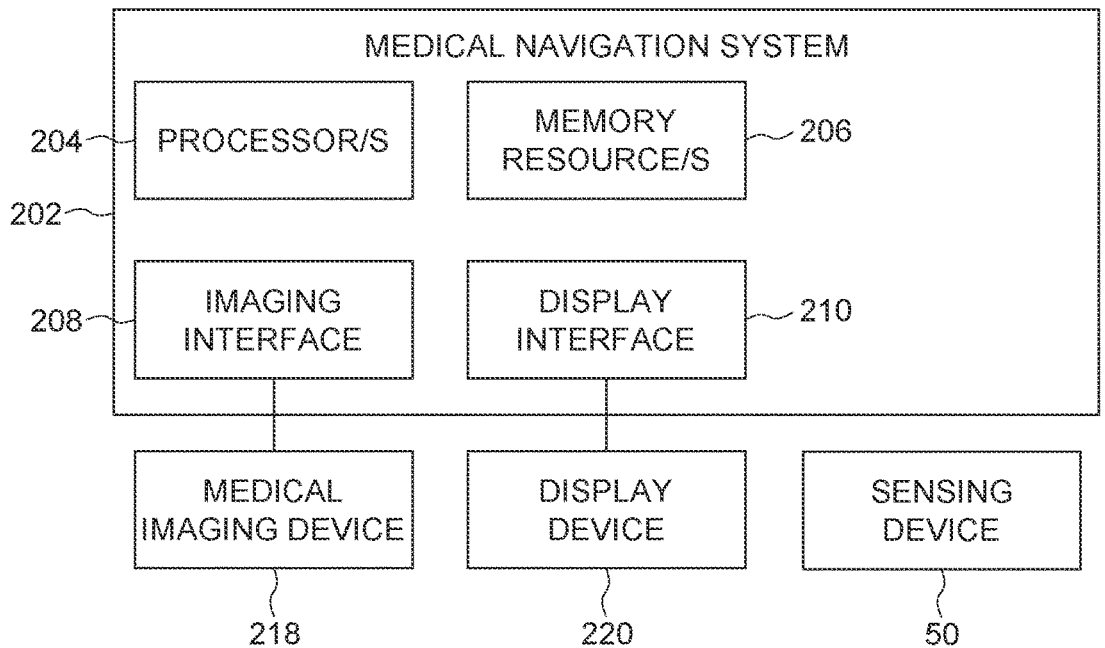
FIG. 5A illustrates an example medical navigation system comprising an imaging interface that receives imaging data from which sensing device data may be extracted.

FIG. 5A illustrates an example medical navigation system comprising an imaging interface that receives imaging data from which sensing device data may be extracted. The medical navigation system 202 includes one or more processors 204, one or more memory resources 206, an imaging interface 208, and a display interface 210. The memory resource/s 206 store instructions that, when executed by the processor/s 204, cause the one or more processors to perform operations that aid in positioning an intravascular device.

The imaging interface 208 is configured to acquire imaging data from at least one medical imaging device 218. For example, the imaging data may include fluoroscopic data received from a medical imaging device 218 that captures fluoroscopic images. As an alternative or addition, the imaging data may include ultrasound data received from a medical imaging device 218 that captures ultrasound images, such as but not limited to a transthoracic echocardiogram device.

In examples, the medical navigation system 202 imaging device 218 extracts sensing device data from the imaging data received over the imaging interface 208. For example, the medical imaging device 218 may capture imaging data relating to a patient's cardiovascular system when a distal portion 52 of a sensing device 50 comprising a plurality of nodes 40 is positioned in a patient's anatomy. In examples, aspects of the plurality of nodes are present in the imaging data. The medical navigation system 202 processes the imaging data to extract node locations 41 of a plurality of nodes 40 within the relevant range of the mitral annulus 38. The medical navigation system 202 may determine one or more projected features of the mitral annulus 38 based on the extracted sensor device data and/or the node locations 41, such as but not limited to a projected plane 70 of the mitral annulus 38, a projected center point 66 of the mitral annulus 38, a projected geometry of the mitral annulus 38, a projected deployment point 72 for an intravascular device, an offset 68 corresponding to the projected deployment point 72, and/or other projected features.

In examples, one or more nodes 40 of the sensing device 50 are or include a radiopaque marker visible on an X-ray image, and the medical navigation system 202 may determine corresponding node location/s 41 by processing one or more fluoroscopic images captured by the medical imaging device 218. For example, the imaging interface 208 may include a fluoroscopic device interface configured to acquire fluoroscopic data describing one or more fluoroscopic images that include images of the distal portion of the sensing device 50. The medical navigation system 202 may extract sensor device data from the fluoroscopic image/s and determine the node locations 41 from the extracted sensor device data.

As an alternative or addition, one or more nodes 40 of the sensing device 50 are or include an echogenic marker visible on an ultrasound image, and the medical navigation system 202 may determine the corresponding node location/s 41 by processing one or more ultrasound images captured by the medical imaging device 218. For example, the imaging interface 208 may include an ultrasound device interface configured to acquire ultrasound data describing one or more ultrasound images that include images of the distal portion 52 of the sensing device 50. The medical navigation system 202 may extract sensor device data from the ultrasound image/s and determine the node locations 41 from the extracted sensor device data.

The display interface 210 is configured to transmit display data to a display device 220. The display device 220 may be integrated with the medical navigation system 202. As an alternative or addition, the display device 220 may be a separate device that externally couples with the display interface 210. In examples, the medical navigation system 202 transmits signals comprising display data over the display interface 210. The signals cause the display device 220 to render one or more enhanced images based on imaging data received over the imaging interface 208. The one or more enhanced images may include example overlay representations of one or more projected features generated based on sensing device data. An example enhanced image is described in greater detail hereinafter.

Figure 5B:
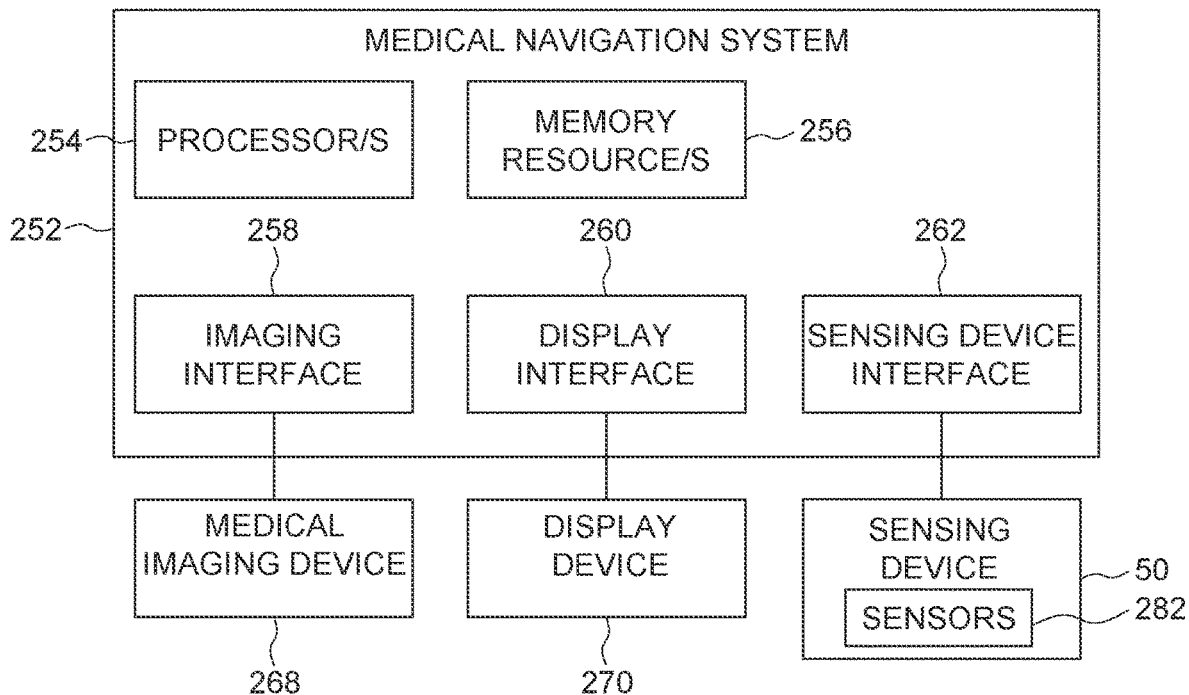
FIG. 5B illustrates an example medical navigation system comprising a sensing device interface that receives sensing device data.

FIG. 5B illustrates an example medical navigation system comprising a sensing device interface that receives sensing device data. The medical navigation system 252 includes one or more processors 254, one or more memory resources 256, an imaging interface 258, a display interface 260, and a sensing device interface 262. The memory resource/s 256 store instructions that, when executed by the processor/s 254, cause the one or more processors to perform operations that aid in positioning an intravascular device.

The imaging interface 258 is configured to acquire imaging data from at least one medical imaging device 268. For example, the imaging data may include fluoroscopic data received from a medical imaging device 268 that captures fluoroscopic images. As an alternative or addition, the imaging data may include ultrasound data received from a medical imaging device 268 that captures ultrasound images, such as but not limited to a transthoracic echocardiogram device.

In examples, the sensing device interface 262 is configured to acquire sensor data from a sensing device 50 comprising a plurality of nodes 40. In examples, one or more nodes 40 of the sensing device 50 include a sensor 282 configured to collect sensor data when the distal portion 52 of the sensing device 50 is inserted in the circumflex artery 30, and the corresponding node location/s may be determined based on sensing device data comprising sensor data transmitted by the corresponding sensor/s 282 over the sensing device interface 262. The sensors 282 may include one or more strain gauges, fiberoptic components, or other sensors. The sensors 282 may be communicatively coupled with transmission media, such as one or more wires, fiberoptic cables, and/or other transmission media. For example, the flexible rod 56 of the sensing device 50 may be a hollow rod or tube, and the transmission media may be disposed inside the flexible rod 56. The sensing device 50 can transmit any such signals to the medical navigation system 252 over the sensing device interface 262. In examples, the sensing device 50 may process signals from the sensors 282 and transmit the processed signals to the medical navigation system 252 over the sensing device interface 262.

The medical navigation system 252 processes the sensor data to extract node locations 41 of the plurality of nodes 40 within the relevant range of the mitral annulus 38. The medical navigation system 252 may determine one or more projected features based on the sensor data and/or the node locations 41, such as but not limited to a projected plane 70 of the mitral annulus 38, a projected center point 66 of the mitral annulus 38, a projected geometry 64 of the mitral annulus 38, a projected deployment point 72 for an intravascular device, an offset 68 corresponding to the projected deployment point 72, and/or other projected features.

The display interface 260 is configured to transmit display data to a display device 270. The display device 270 may be integrated with the medical navigation system 252. As an alternative or addition, the display device 270 may be a separate device that externally couples with the display interface 260. In examples, the medical navigation system 252 transmits signals comprising display data over the display interface 260. The signals cause the display device 270 to render one or more enhanced images based on imaging data received over the imaging interface 258. The one or more enhanced images may include example overlay representations of one or more projected features generated based on sensing device data.

The processor/s 204, 254 may include any conventional processor, such as commercially available CPUs. As an alternative or addition, the processor/s 204, 254 may include a dedicated device such as an ASIC or other hardware-based processor. Although FIGS. 5A-5B functionally illustrates the processor 204, 254, memory resource/s 206, 256, and other elements of the respective medical navigation system 202, 252 as being within the same block, the processor/s 204, 254, medical navigation system 202, 252, and/or memory resource/s 206, 256, may include multiple processors, computers, or memories that may be stored within the same physical housing and/or different physical housings. Accordingly, references to a processor, computer, or memory will be understood to include references to a collection of processors, computers, or memories that may or may not operate in parallel.

The memory resource/s 206, 256, may include any type of memory capable of storing information accessible by the processor/s 204, 252, such as a hard-drive, memory card, ROM, RAM, DVD, CD-ROM, write-capable, or read-only memory. The memory resource/s 206, 256 of the respective medical navigation system 204, 254 may store information accessible by the respective processor/s 204, 254, including instructions that may be executed by the processor/s 204, 254. The instructions can be any set of instructions to be executed directly, such as machine code, or indirectly, such as scripts, by the processor. In that regard, the terms "instructions," "application," "steps" and "programs" can be used interchangeably herein. The instructions may be stored in object code format for direct processing by the processor 204, 254, or in any other computer language including scripts or collections of independent source code modules that are interpreted on demand or compiled in advance. Functions, methods and routines of the instructions are explained in more detail below.

The memory resource/s 206, 256 may also include data that may be retrieved, manipulated or stored by the processor/s 204, 254. The data may be retrieved, stored or modified by the processor/s 204, 254 in accordance with the instructions. For instance, although the subject matter described herein is not limited by any particular data structure, the data may be stored in computer registers, in a relational database as a table having many different fields and records, or in one or more XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

Figure 6A:
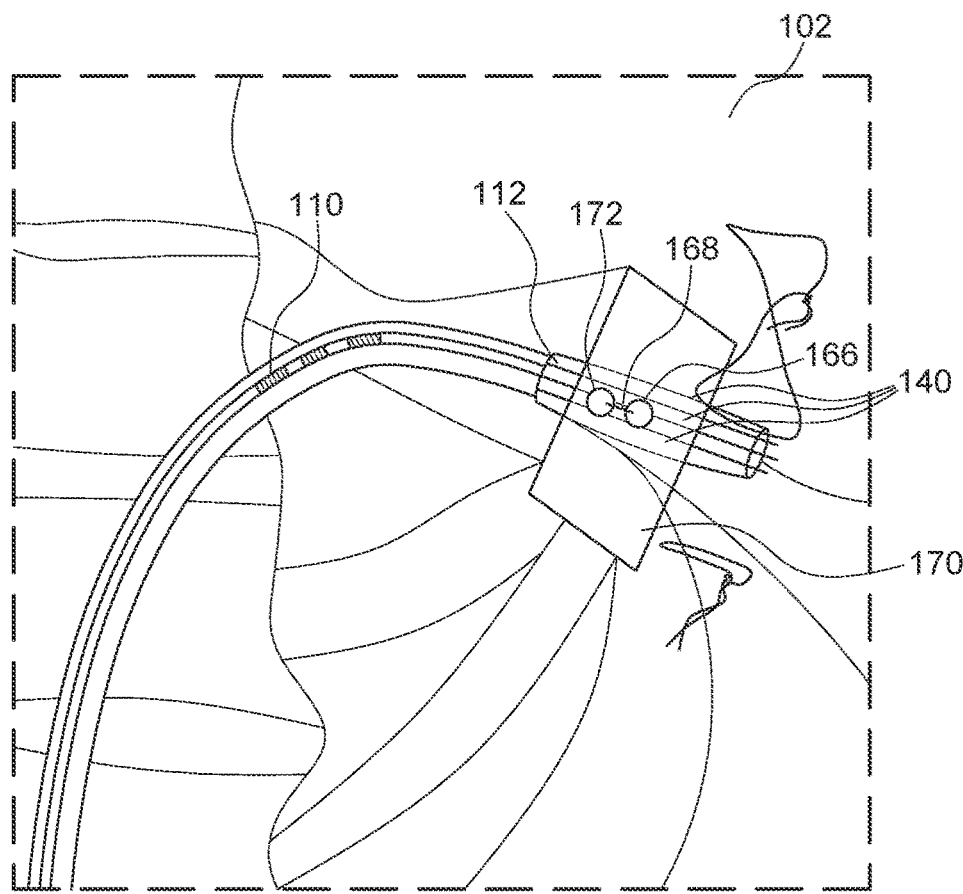
FIG. 6A illustrates an example image including example overlay representations of projected features on an enhanced image.

FIG. 6A illustrates an example image including example overlay representations of projected features on an enhanced image. An enhanced image 102 includes a rendering of a patient's anatomy based on imaging data, such as imaging data received from a medical imaging device 218, 268. For example, the enhanced image 102 may include a rendering of fluoroscopic data, ultrasound data, or other imaging data collected by the medical imaging device 218, 268. The imaging data may be collected by the medical imaging device 218, 268 at any appropriate viewing angle for facilitating the intravascular procedure, such as but not limited to a right anterior oblique (RAO) 20-caudal 20 view, a left anterior oblique (LAO) 40-caudal 20 view, an en face view, an AP-caudal view, and/or another appropriate viewing angle. The rendering of the patient's anatomy may include a fluoroscopic image, an ultrasound image, a medical image of another imaging format, and/or a processed image generated by analyzing one or more medical images. The enhanced image 102 may be generated from imaging data received from one or multiple medical imaging devices 218, 268. The enhanced image 102 may include a two-dimensional rendering of the patient's anatomy and/or a three-dimensional rendering of the patient's anatomy. In examples, the medical navigation system 208, 258 generates a time series of enhanced images 102 to produce a video feed, which may include a video feed in real-time. In examples, a medical navigation system 202, 252 generates the enhanced image 102 based on imaging data received over an imaging interface 208, 258 and sensing device data extracted from imaging data and/or sensor data received over a sensing device interface 262.

The enhanced image 102 includes an overlay representation of one or more projected features determined based on the sensing device data. For example, the enhanced image 102 may include a projected plane representation 170 corresponding to a projected plane 70 of the mitral annulus 38. As an alternative or addition, the enhanced image 102 may include a projected center point representation 166 corresponding to a projected center point 66 of the mitral annulus 38. As an alternative or addition, the enhanced image 102 may include an offset representation 168 corresponding to an offset 68 for deployment of the intravascular device. As an alternative or addition, the enhanced image 102 may include a projected deployment point representation 172 corresponding to a projected deployment point 72 for the intravascular device. The projected plane representation 170, the projected center point representation 166, the offset representation, the projected deployment point representation 172, and/or other overlay representations may be rendered in the enhanced image 102 to appear in their corresponding node location/s 41 in the enhanced image 102. The rendering of the patient's anatomy is registered to the coordinate system in which the projected features are determined such that the overlay representations appear in the correct location relative to the rendering of the patient's anatomy. In examples, the enhanced image 102 may be a view of the patient's anatomy that is taken parallel to the projected plane 70. For example, a medical imaging device 218, 268 may be positioned to take images that are parallel to the projected plane 70 after the projected plane 70 is determined.

In examples, the enhanced image 102 includes an overlay representation of one or more nodes 40 of the sensing device 50. The node representation/s 140 are rendered in the enhanced image 102 to appear in their corresponding node location/s 41 in the enhanced image 102. As an alternative or addition, the imaging data used to generate the rendering of the patient's anatomy may already include one or more node representations 140. For example, when one or more nodes 40 include a radiopaque marker, imaging data obtained from a fluoroscopy device will include one or more node representations 140 in the fluoroscopic images obtained by the fluoroscopy device. As another example, when one or more nodes 40 include an echogenic marker, imaging data obtained from an ultrasound device will include one or more node representations 140 in the ultrasound images obtained by the ultrasound device.

The imaging data may include a representation of one or more other device features captured by a medical imaging device 218, 268, such as a deployment device representation 110 of a feature of a deployment device for deploying an intravascular device, an intravascular device representation 112 of a feature of the intravascular device, and/or a representation of another feature of the sensing device 50.

Figure 6B:
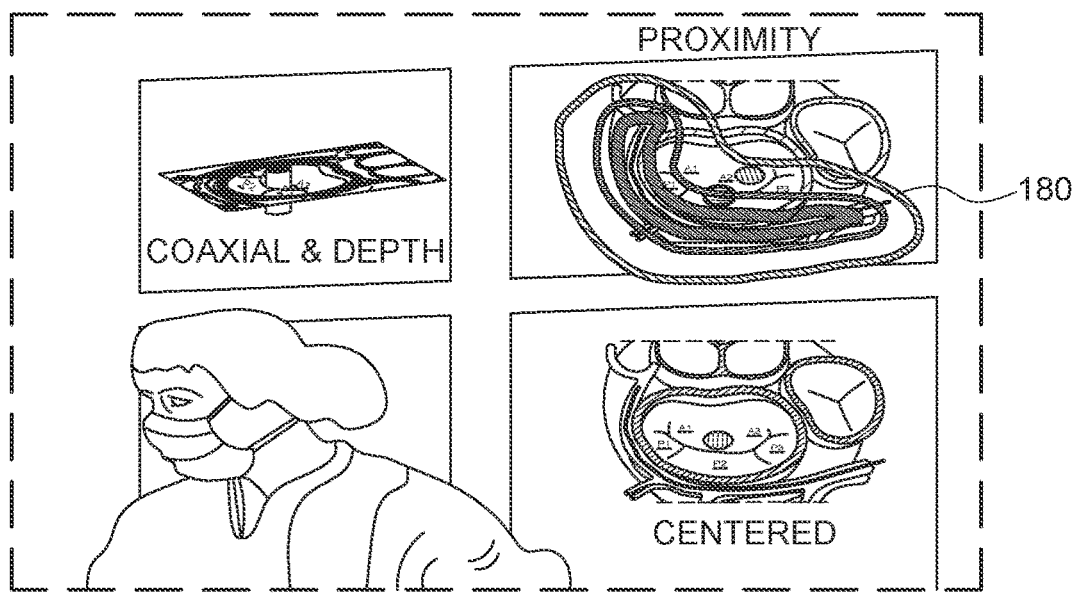
FIG. 6B illustrates an example set of images including example overlay representations of projected features on an enhanced image.

FIG. 6B illustrates an example set of images including example overlay representations of projected features on an enhanced image. In FIG. 6B, different enhanced images 102 are displayed on multiple display devices 220, 270. In examples, the overlay representations include one or more projected proximity features 180. For example, inductive or magnetic proximity sensing between the sensing device 50 and the intravascular device deployment system may be used and displayed to indicate to a user or robotic sensor that the delivery system and/or the intravascular device is approaching contact with the native valve anatomy and/or the chamber walls.

If the intravascular device is a mitral valve replacement device, it may be introduced into a patient's vasculature in a collapsed condition within a deployment device, a deployment sheath overlying the mitral valve replacement device and maintaining the mitral valve replacement device in the collapsed condition. The deployment device may be inserted into the patient's femoral vein and advanced into the patient's right atrium. A distal end of the deployment device, which may include the deployment sheath, may be passed through an opening within the atrial septum and into the left atrium. The opening within the atrial septum may have been created via conventional means in a prior step. Once the deployment sheath is in the left atrium, one or more steering mechanisms may orient the deployment sheath, and thus the mitral valve replacement device contained therein, in a desired position and orientation. Typically, it is desirable for the deployment sheath and/or mitral valve replacement device contained therein to be substantially coaxial with the mitral valve annulus prior to deployment.

The above-described enhanced images 102 may be displayed while the deployment device is approaching, near, or at the mitral annulus 38. Because soft tissue is often difficult to clearly see during conventional imaging, a user may need to rely on experience and subjective information to properly orient the deployment sheath in the absence of information provided by the enhanced images 102. However, the position and orientation of the deployment sheath relative to the mitral annulus 38 may be more objective and more precise if the user is able to refer to information provided in the enhanced images 102. For example, the deployment sheath and the mitral valve replacement are typically easily visible on imaging, and the user may orient the deployment sheath substantially orthogonally to the projected plane representation 170 on the enhanced images 102 to help ensure that the deployment sheath is positioned parallel to the longitudinal axis extending through the mitral annulus 38. Further, to help ensure that the deployment sheath is coaxial with the mitral annulus 38, the user may steer the deployment sheath until the deployment sheath is seen on the enhanced images 102 as being aligned with the projected center point representation 166. It is also generally important to deploy the mitral valve replacement at a particular depth relative to the mitral annulus 38. The user may distally advance (or proximally withdraw) the position of the deployment sheath, and the mitral valve replacement maintained therein, until the deployment sheath is positioned at, or aligned with, the offset representation 168. Some or all of these positioning steps may be performed while viewing both the deployment sheath (and/or the mitral valve replacement maintained therein) and the information overlaid onto the enhanced images 102 to assist with precise and objective positioning. With the desired position confirmed, the user may withdraw the deployment sheath relative to the replacement mitral valve, allowing the replacement mitral valve to self-expand and deploy into the mitral annulus 38.

Example Processes

Figure 7:
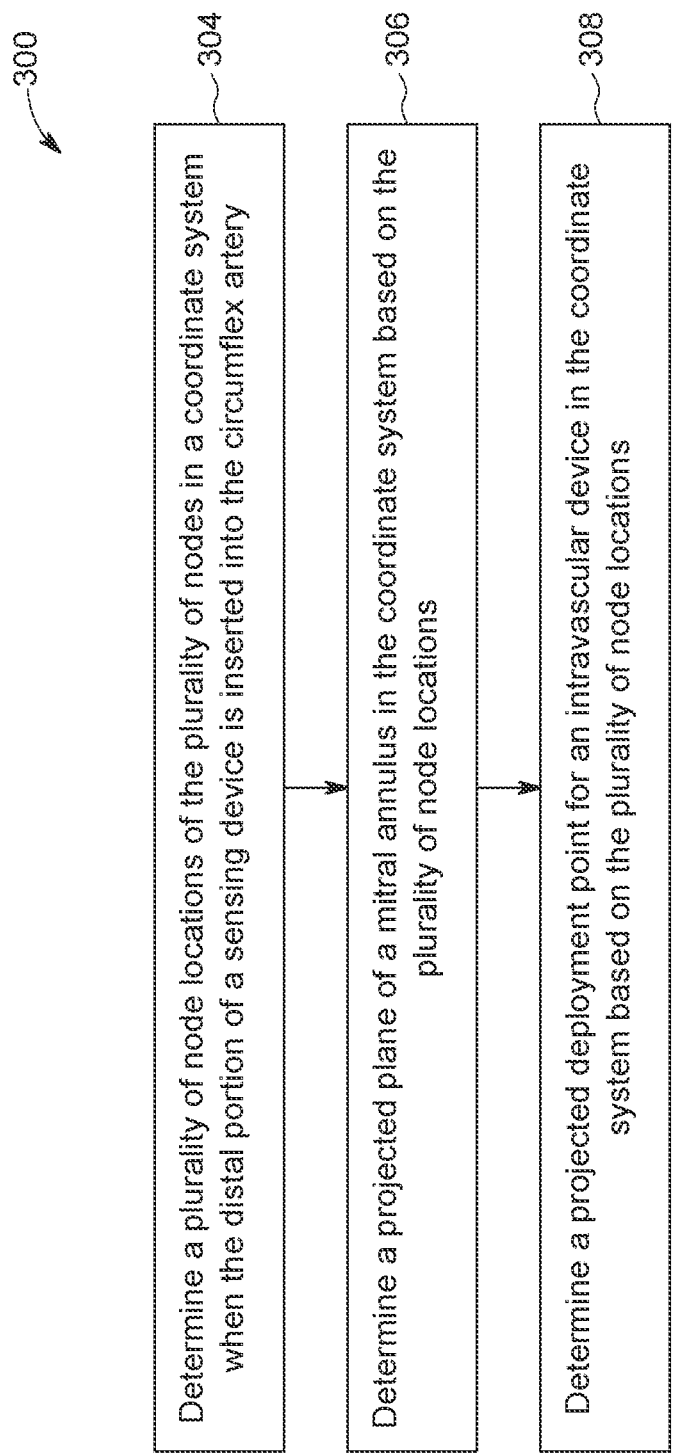
FIG. 7 illustrates a flow diagram of an example process for positioning an intravascular device.

FIG. 7 illustrates a flow diagram of an example process for positioning an intravascular device. Process 300 may be performed by one or more computing devices and/or processes thereof. For example, one or more blocks of process 300 may be performed by a computer system 400, such as but not limited to a medical navigation system 202, 252. Process 300 will be described with respect to a medical navigation system 202, 252, but is not limited to performance by such.

At block 304, the medical navigation system 202, 252 determines a plurality of node locations 41 of a plurality of nodes 40 in a coordinate system when the distal portion 52 of a sensing device 50 is inserted into the circumflex artery 30 of a patient. Preferably, the sensing device 50 is inserted into the patient in a minimally invasive manner, for example via any suitable transvascular approach. The sensing device may include a flexible rod 56, where the plurality of nodes 40 are deployed on the distal portion of the flexible rod 56. In examples, the distal portion 52 of the sensing device 50 is positioned such that a distal reference point of the sensing device 50 is aligned with a septal wall of the patient. In examples, the nodes 40 are evenly spaced on the distal portion 52 of the sensing device 50. In examples, the plurality of nodes 40 includes a plurality of radiopaque markers, and determining the plurality of node locations 41 includes processing one or more fluoroscopy images. As an addition or alternative, the plurality of nodes 40 may include a plurality of echogenic markers, and determining the plurality of node locations 41 includes processing one or more ultrasound images. As an addition or alternative, the plurality of nodes 40 may include a plurality of sensors, and determining the plurality of node locations 41 is based on sensor data transmitted by the plurality of sensors.

At block 306, the medical navigation system 202, 252 determines a projected plane 70 of a mitral annulus 38 in the coordinate system based on the plurality of node locations 41. In examples, determining the projected plane 70 of the mitral annulus 38 includes performing an interpolation procedure on the plurality of node locations 41.

At block 308, the medical navigation system 202, 252 determines a projected deployment point 72 for an intravascular device in the coordinate system based on the projected plane 70 and the plurality of node locations 41. In examples, the intravascular device is a mitral valve replacement device. As an addition or alternative, determining the projected deployment point 72 includes determining a projected center point 66 of the mitral annulus 38. As an addition or alternative, determining the projected deployment point 72 may include determining an offset 68 from the projected center point 66. In examples, determining the projected center point 66 of the mitral annulus 38 includes performing one or more triangulation calculations based on the plurality of node locations 41.

Implementation Mechanisms—Hardware Overview

The techniques described herein may be implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field-programmable gate arrays (FPGAs) that are persistently programmed to perform the techniques. Alternatively and/or in addition, the one or more special-purpose computing devices may include one or more general-purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, and/or any other device that incorporates hard-wired or program logic to implement the techniques.

Figure 8:
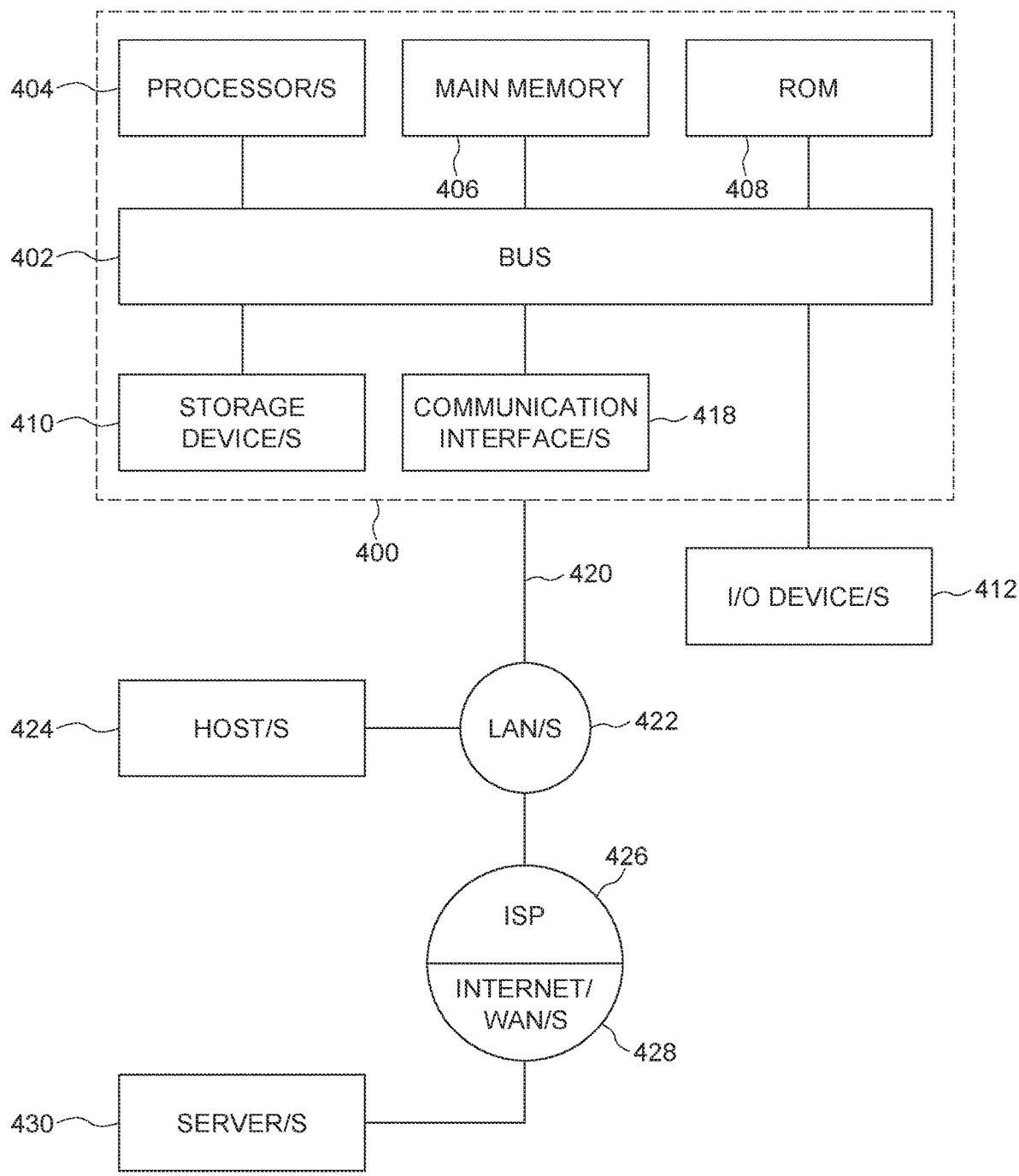
FIG. 8 is a block diagram that illustrates a computer system upon which one or more examples may be implemented.

FIG. 8 is a block diagram that illustrates a computer system upon which one or more examples may be implemented. The computer system 400 includes a bus 402 or other communication mechanism for communicating information, and one or more hardware processors 404 couples with bus 402 for processing information, such as computer instructions and data. The processor/s 404 may include one or more general-purpose microprocessors, graphical processing units (GPUs), coprocessors, central processing units (CPUs), and/or other hardware processing units.

The computer system 400 also includes one or more units of main memory 406 coupled to the bus 402, such as random-access memory (RAM) or other dynamic storage, for storing information and instructions to be executed by the processor/s 404. Main memory 406 may also be used for storing temporary variables or other intermediate information during execution of instructions to be executed by the processor/s 404. Such instructions, when stored in non-transitory storage media accessible to the processor/s 404, turn the computer system 400 into a special-purpose machine that is customized to perform the operations specified in the instructions. In some embodiments, main memory 406 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

The computer system 400 may further include one or more units of read-only memory (ROM) 408 or other static storage coupled to the bus 402 for storing information and instructions for the processor/s 404 that are either always static or static in normal operation but reprogrammable. For example, the ROM 408 may store firmware for the computer system 400. The ROM 408 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 410, such as a magnetic disk or optical disk, is provided and coupled to the bus 402 for storing information and/or instructions. The storage device/s 410 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid-state drives, flash memory, optical disks, one or more forms of non-volatile random-access memory (NVRAM), and/or other non-volatile storage media.

The computer system 400 may be coupled via the bus 402 to one or more input/output (I/O) devices 412. For example, the I/O device/s 412 may include one or more displays for displaying information to a computer user, such as a cathode ray tube (CRT) display, a Liquid Crystal Display (LCD) display, a Light-Emitting Diode (LED) display, a projector, and/or any other type of display.

The I/O device/s 412 may also include one or more input devices, such as an alphanumeric keyboard and/or any other keypad device. The one or more input devices may also include one or more cursor control devices, such as a mouse, a trackball, a touch input device, or cursor direction keys for communicating direction information and command selections to the processor 404 and for controlling cursor movement on another I/O device (e.g. a display). A cursor control device typically has degrees of freedom in two or more axes, (e.g. a first axis x, a second axis y, and optionally one or more additional axes z), that allows the device to specify positions in a plane. In some embodiments, the one or more I/O device/s 412 may include a device with combined I/O functionality, such as a touch-enabled display.

Other I/O device/s 412 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with the processor/s 404 over the bus 402.

The computer system 400 may implement the techniques described herein using customized hard-wired logic, one or more ASICs or FPGAs, firmware, and/or program logic which, in combination with the computer system causes or programs, causes computer system 400 to be a special-purpose machine. In examples, the techniques herein are performed by the computer system 400 in response to the processor/s 404 executing one or more sequences of one or more instructions contained in main memory 406. Such instructions may be read into main memory 406 from another storage medium, such as the one or more storage device/s 410. Execution of the sequences of instructions contained in main memory 406 causes the processor/s 404 to perform the process steps described herein. In alternative embodiments, hard-wired circuitry may be used in place of or in combination with software instructions.

The computer system 400 also includes one or more communication interfaces 418 coupled to the bus 402. The communication interface/s 418 provide two-way data communication over one or more physical or wireless network links 420 that are connected to a local network 422 and/or a wide area network (WAN), such as the Internet. For example, the communication interface/s 418 may include an integrated services digital network (ISDN) card, cable modem, satellite modem, or a modem to provide a data communication connection to a corresponding type of telephone line. Alternatively and/or in addition, the communication interface/s 418 may include one or more of: a local area network (LAN) device that provides a data communication connection to a compatible local network 422; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network; and other networking devices that establish a communication channel between the computer system 400 and one or more LANs 422 and/or WANs.

The network link/s 420 typically provides data communication through one or more networks to other data devices. For example, the network link/s 420 may provide a connection through one or more local area networks 422 (LANs) to one or more host computers 424 or to data equipment operated by an Internet Service Provider (ISP) 426. The ISP 426 provides connectivity to one or more wide area networks 428, such as the Internet. The LAN/s 422 and WAN/s 428 use electrical, electromagnetic, or optical signals that carry digital data streams. The signals through the various networks and the signals on the network link/s 420 and through the communication interface/s 418 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise the bus 402. Transmission media can also take the form of acoustic or light waves, such as those generated during radio-wave and infra-red data communications.

Various forms of media may be involved in carrying one or more sequences of one or more instructions to the processor 404 for execution. For example, the instructions may initially be carried on a magnetic disk or solid-state drive of a remote computer. The remote computer can load the instructions into its main memory 406 and send the instructions over a telecommunications line using a modem. A modem local to the computer system 400 can receive the data on the telephone line and use an infra-red transmitter to convert the data to an infra-red signal. An infra-red detector can receive the data carried in the infra-red signal and appropriate circuitry can place the data on the bus 402. The bus 402 carries the data to main memory 406, from which the processor 404 retrieves and executes the instructions. The instructions received by main memory 406 may optionally be stored on the storage device 410 either before or after execution by the processor 404.

The computer system 400 can send messages and receive data, including program code, through the network(s), the network link 420, and the communication interface/s 418. In the Internet example, one or more servers 430 may transmit signals corresponding to data or instructions requested for an application program executed by the computer system 400 through the Internet 428, ISP 426, local network 422 and a communication interface 418. The received signals may include instructions and/or information for execution and/or processing by the processor/s 404. The processor/s 404 may execute and/or process the instructions and/or information upon receiving the signals by accessing main memory 406, or at a later time by storing them and then accessing them from the storage device/s 410.

Other Aspects of Disclosure

Although the concepts herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

While certain embodiments of the present disclosure have been described in detail, with reference to specific configurations, parameters, components, elements, etcetera, the descriptions are illustrative and are not to be construed as limiting in scope.

Furthermore, it should be understood that for any given element or component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, or less than 1% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other, and does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

It will also be appreciated that embodiments described herein may include properties, features (e.g., ingredients, components, members, elements, parts, and/or portions) described in other embodiments described herein. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. A method for positioning an intravascular device, the method comprising:
   inserting, into a circumflex artery, a distal portion of a sensing device, the distal portion comprising a plurality of nodes;
   determining a plurality of node locations of the plurality of nodes in a coordinate system when the distal portion of the sensing device is inserted into the circumflex artery;
   determining a projected plane of a mitral annulus in the coordinate system based on the plurality of node locations; and
   determining a projected deployment point for the intravascular device in the coordinate system based on the plurality of node locations.

2. The method of claim 1, wherein the intravascular device is a mitral valve replacement device.

3. The method of claim 1, wherein inserting the distal portion of the sensing device comprises inserting the distal portion of the sensing device until a distal reference point of the sensing device is aligned with a septal wall.

4. The method of claim 1, wherein determining the projected plane of the mitral annulus comprises performing an interpolation procedure on the plurality of node locations.

5. The method of claim 1, wherein determining the projected deployment point comprises determining a projected center point of the mitral annulus.

6. The method of claim 5, wherein determining the projected deployment point comprises determining an offset from the projected center point.

7. The method of claim 5, wherein determining the projected center point of the mitral annulus comprises performing one or more triangulation calculations based on the plurality of node locations.

8. The method of claim 1, wherein nodes of the plurality of nodes are evenly spaced on the distal portion of the sensing device.

9. The method of claim 1:
   wherein the plurality of nodes includes a plurality of radiopaque markers; and
   wherein determining the plurality of node locations comprises processing one or more fluoroscopy images during a procedure for deploying the intravascular device.

10. The method of claim 1:
    wherein the plurality of nodes includes a plurality of echogenic markers; and wherein determining the plurality of node locations comprises processing one or more ultrasound images during a procedure for deploying the intravascular device.

11. The method of claim 1:
wherein the plurality of nodes includes a plurality of sensors; and
wherein determining the plurality of node locations is based on sensor data transmitted by the plurality of sensors.

12. A medical navigation system for positioning an intravascular device, the medical navigation system comprising:
a sensing device comprising a plurality of nodes disposed on a distal portion of the sensing device, wherein the distal portion of the sensing device is configured to be inserted into a circumflex artery during a procedure for deploying the intravascular device;
one or more processors; and
at least one memory storing instructions that, when executed by the one or more processors, cause the one or more processors to:
determine a plurality of node locations of the plurality of nodes in a coordinate system when the distal portion of the sensing device is inserted into the circumflex artery;
determine a projected plane of a mitral annulus in the coordinate system based on the plurality of node locations; and
determine a projected deployment point for the intravascular device in the coordinate system based on the plurality of node locations.

13. The medical navigation system of claim 12, further comprising:
at least one imaging interface configured to acquire imaging data from at least one medical imaging device; and
a display interface configured to transmit display data to a display device;
wherein the instructions, when executed by the one or more processors, cause the one or more processors to:
transmit signals over the display interface that cause the display device to render one or more enhanced images based on the imaging data, the one or more enhanced images including an overlay representation of the projected deployment point.

14. The medical navigation system of claim 13,
wherein the plurality of nodes includes a plurality of radiopaque markers;
wherein the at least one imaging interface comprises a fluoroscopic device interface configured to acquire fluoroscopic data describing one or more fluoroscopic images comprising the mitral annulus and the distal portion of the sensing device; and
wherein determining the plurality of node locations comprises analyzing the fluoroscopic data.

15. The medical navigation system of claim 13,
wherein the plurality of nodes includes a plurality of echogenic markers;
wherein the at least one imaging interface comprises an ultrasound device interface configured to acquire ultrasound data describing one or more ultrasound images comprising the mitral annulus and the distal portion of sensing device; and
wherein determining the plurality of node locations comprises analyzing the ultrasound data.

16. The medical navigation system of claim 12:
further comprising a sensing device interface configured to acquire sensor data from the sensing device;
wherein the plurality of nodes includes a plurality of sensors configured to transmit sensor data to the sensing device interface; and
wherein determining the plurality of node locations comprises analyzing the sensor data transmitted from the plurality of sensors.

17. The medical navigation system of claim 12, wherein the intravascular device is a mitral valve replacement device.

18. The medical navigation system of claim 12, wherein determining the projected plane of the mitral annulus comprises performing an interpolation procedure on the plurality of node locations.

19. The medical navigation system of claim 12, wherein determining the projected deployment point comprises:
determining a projected center point of the mitral annulus; and
determining an offset from the projected center point.

20. The medical navigation system of claim 19, wherein determining the projected center point of the mitral annulus comprises performing one or more triangulation calculations based on the plurality of node locations.

* * * * *